INVENTORS
CHARLES A. PIPER
LOWELL R. BROWN
BY
Ellsworth R. Roston
ATTORNEY

March 17, 1953 C. A. PIPER ET AL 2,631,778
DIGITIZER
Filed June 6, 1950 2 SHEETS—SHEET 2

INVENTORS
CHARLES A. PIPER
LOWELL R. BROWN
BY
Ellsworth R. Roston
ATTORNEY

Patented Mar. 17, 1953

2,631,778

UNITED STATES PATENT OFFICE 2,631,778

DIGITIZER

Charles A. Piper, Detroit, and Lowell R. Brown, Royal Oak, Mich., assignors to Bendix Aviation Corporation, Detroit, Mich., a corporation of Delaware Application June 6, 1950, Serial No. 166,462

13 Claims. (Cl. 235—61)

This invention relates to apparatus for and methods of expressing a continuously variable quantity as a multi-digital number and determining the value of each digit in the number. The invention is especially adapted to provide numerical information in such form that it can be easily transmitted to distant points and decoded at these points.

Accurate measurements of such variable quantities as temperature or pressure or angles of movement of a gun are often required. Frequently, it is necessary to know the quantity to an accuracy of three or four or more significant figures. For example, the figures "2794" may express a temperature of 279.4° K. to four significant figures.

It is often desirable to transmit such measurements to a central station for permanent recordation. In order to preserve the accuracy of measurement, the information must be transmitted with as small an error as possible. One mode of transmission utilizes the time interval between successive pulses to indicate numerical values, the time interval being proportional to the numerical value. If a single time interval is employed to indicate the total value of the variable quantity it is very difficult to achieve an accuracy of transmission and reception corresponding to the accuracy of measurement. For example, an error great enough to affect the value of the second digit, as well as the last and penultimate digits, may result from the transmission and reception, in a single time interval, of a temperature such as 279.4° K.

To increase the accuracy of transmission and reception, the numerical measurements may be broken down into components, each of which is separately transmitted. Thus, the numerical value of each digit may be transmitted in sequence. For a temperature of 279.4° K., a first pulse may be transmitted as a time reference and after an appropriate time interval corresponding to the numeral "2," a second pulse may be transmitted. A third pulse may subsequently be transmitted an appropriate time interval after the second pulse, this interval corresponding to the numeral "7," etc. Since there are only ten possible values for each digit, the error in transmission and reception may approach ±5%, or a total of 10%, before any difference occurs between the value measured and the value transmitted and recorded.

Before any information as to the value of each digit can be transmitted, the measurements must be digitized and converted into a form suitable for transmission. Digitizers are now in use which break multi-digital numbers into their separate components and determine the values of these components, but these digitizers do not provide information in a form which can be easily transmitted. This invention provides digitizers which produce voltages proportional to the value of each digit, and each voltage determines the time interval between sequentially transmitted pulses.

An object of this invention is to provide apparatus for expressing a variable quantity as a multi-digital number and accurately and reliably determining the value of each digit.

Another object of the invention is to provide apparatus of the above indicated character which is constructed simply and compactly.

A further object is to provide apparatus of the above indicated character for producing information as to the value of each digit in a multi-digital number in such form that the information can be easily transmitted to a central station for recordation and analysis.

Still another object is to provide apparatus of the above indicated character for giving an electrical indication of the value of each digit in a multi-digital number.

A still further object is to provide methods for so expressing a variable quantity as a multi-digital number and determining the value of each digit in the number that the information obtained can be easily transmitted to a distant station for recordation and analysis.

Other objects of the invention will be apparent from a detailed description of the invention and from the appended drawings and claims.

Figure 1:
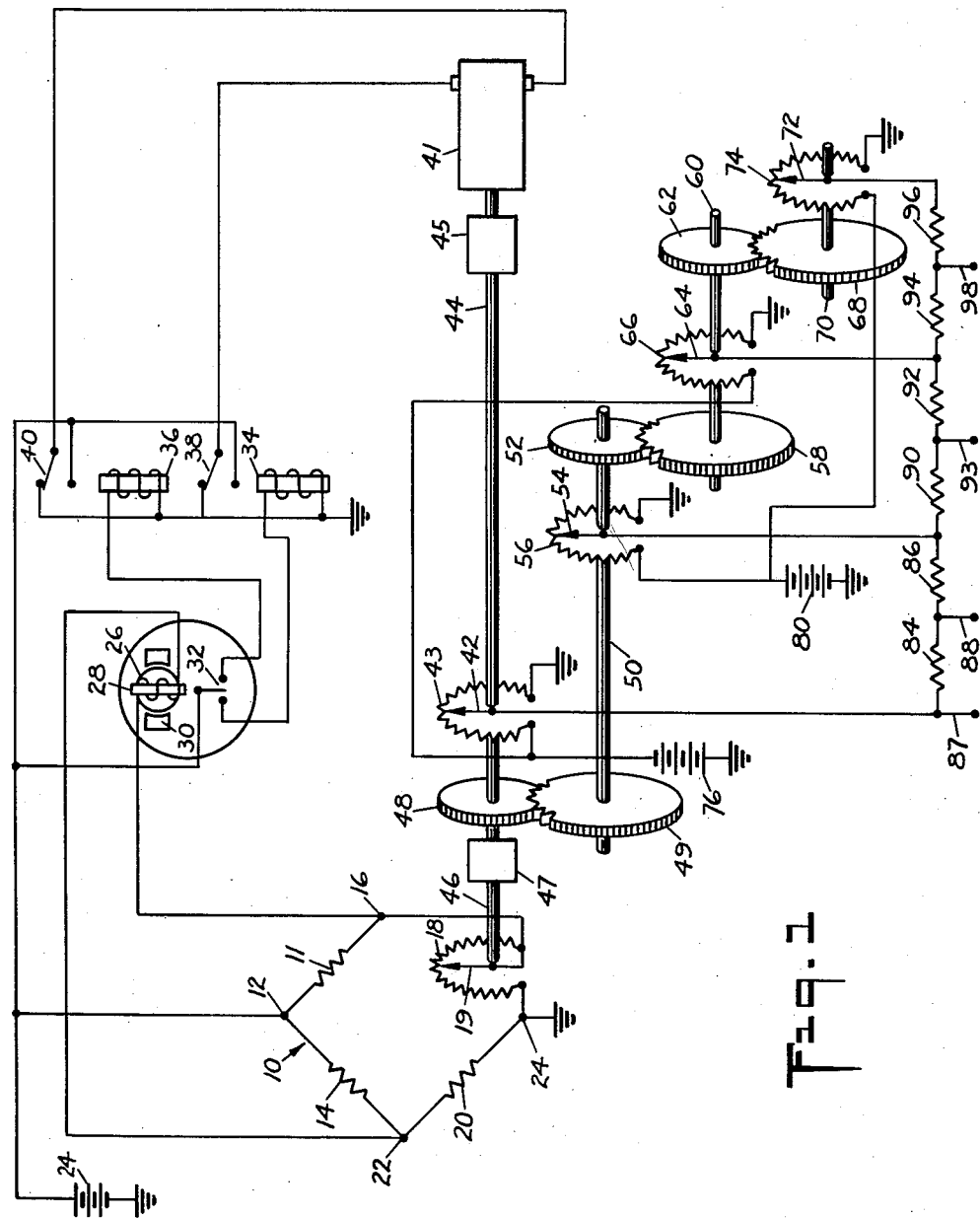
Figure 1 is a schematic diagram of one embodiment of the invention.

In one embodiment of the invention, a first voltage is obtained which is proportional to a multi-digital number. In the same manner, a second voltage of opposite polarity is obtained which is proportional to a number formed by the removal of the first digit from the multi-digital number. The two voltages are then combined to produce a resultant voltage which is proportional to the value of the first digit. For example, with a temperature of 279.4° K., a first voltage of +2.794 volts is combined with a second voltage of −.794 volt to produce a resultant voltage of 2.000 volts. Similarly, a voltage of 7.94 volts is combined with a voltage of 0.94 volt to obtain a resultant voltage of −7 volts, which is proportional to the second digit of the multi-digital number. Only the magnitude, and not the polarity, of the resultant voltages is employed to indicate the value of the respective digits. Voltages in accordance with the values of the other digits are obtained in a similar manner.

The operation of the digitizer is illustrated in connection with a resistance thermometer, generally indicated at 10, which is designed to give relatively high accuracies. The resistance thermometer includes a resistance 11 which is connected at a terminal 12 to a resistance 14 and at a terminal 16 to a potentiometer 18 having a rotatable arm 19. The resistance 14 and a resistance 20 have a common terminal 22, and the resistances 18 and 20 have a common terminal 24, which is grounded. The resistance 11 is exposed to the medium whose temperature is to be determined while the resistance 14 and 20 and the potentiometer 18 are located in a heat-insulated box.

The positive terminal of a power supply, such as a battery 24, is connected to the terminal 12, and the negative terminal of the battery is grounded. A winding 26 having an armature 28 is connected between the terminals 16 and 22 and is located in the field of a magnet 30. The movable contact of a double-throw switch 32 is suspended from the armature 28 and is connected to the positive terminal of the battery 24, while the stationary contacts of the switch 32 are connected to grounded solenoids 34 and 36. The solenoids 34 and 36 act upon the movable contacts of double-throw switches 38 and 40, respectively, the movable contacts being connected to opposite armature terminals of a servomotor 41. The stationary contacts of the switch 38 are in parallel with the stationary contacts of the switch 40 between the positive terminal of the battery 24 and ground.

The motor 41 drives the rotatable arm 42 of a potentiometer 43, the arm 42 being carried by a shaft 44 which is driven from a gear train 45. The shaft 44 in turn drives the arm 19 through a shaft 46 which is coupled to the shaft 44 by a gear train 47. The gear train 47 serves to increase the temperature range of the potentiometer 18. A gear 48 is mounted on the shaft 44 in mesh with a gear 49 which is carried by a shaft 50 and which has a 10:1 ratio to the gear 48. A gear 52 and a rotatable arm 54 of a potentiometer 56 are also carried by the shaft 50. The gear 52 meshes with a gear 58 mounted on a shaft 60, which also carries a gear 62 and a rotatable arm 64 of a potentiometer 66. The gear 52 has a 1:10 ratio with the gear 58, and this ratio is also provided between the gear 62 and a gear 68 mounted on a shaft 70. The shaft 70 carries a rotatable arm 72 of a potentiometer 74.

The potentiometers 43 and 66 are connected at one end to the negative terminal of a suitable power supply, such as a battery 76, and are grounded at the other end, the positive terminal of the battery also being grounded. The potentiometers 56 and 74 are connected between the positive terminal of a battery 80 and ground, and the negative terminal of the battery is grounded. The batteries 76 and 80 apply substantially the same voltages, such as 10 volts, to the potentiometers, which preferably have substantially the same resistance values.

The potentiometer arms 42 and 54 are connected to each other through resistances 84 and 86, the resistance 84 preferably having a value at least ten times as great as the potentiometers and approximately a 1:10 ratio with the resistance 86. An output lead 87 extends from the potentiometer arm 42 and an output lead 88 extends from the common terminal between the resistances 84 and 86. Similarly, the potentiometer arms 54 and 64 are in series with a pair of resistances 90 and 92, which have approximately a 1:10 ratio with each other and are at least 10 times as great as the potentiometers. An output lead 93 extends from the common terminal between the resistances 90 and 92. A resistance 94 is in series with a resistance 96 and with the potentiometer arms 64 and 72 and has approximately a 1:10 ratio with resistance 96 and at least a 10:1 ratio with the potentiometers 66 and 74. An output lead 98 extends from the common terminal between the resistances 94 and 96.

As previously explained, the resistance 11 is the only exposed resistance in the resistance thermometer 10. The resistance 11 may be provided with a linear characteristic over the temperature range to be measured, or it may be provided with a non-linear characteristic and may be driven by the motor 41 in such a manner that a linear temperature response is obtained. Therefore, any changes in temperature produce a proportional change in the resistance 11, causing a voltage difference to appear between the terminals 16 and 22. The winding 26 is energized with a polarity which is determined by the change in temperature, an increase in temperature producing one polarity and a decrease in temperature an opposite polarity. When the winding is energized, the armature 28 is pivoted by the magnet 30 so that the movable contact of the switch 32 touches one of the stationary contacts. With increases in temperature, the movable contact of the switch 32 swings to the right, causing a continuous circuit to be established which includes the battery 24, the switch 32 and the solenoid 36. The resultant current through the solenoid 36 causes the movable contact of the switch 40 to be attracted downwardly, and a continuous circuit is established from the battery 24 through the switch 40, the servomotor 41 and the switch 38 to ground and through ground back to the battery. The servomotor therefore rotates the potentiometer arm 19 in a direction to increase the effective resistance supplied by the potentiometer 18. The rotation of the arm 19 continues until the voltage in the winding 26 is reduced to zero. If the temperature should decrease, the servomotor rotates the potentiometer arm 19 in an opposite direction to decrease the effective resistance supplied by the potentiometer 18.

As the motor operates the potentiometer arm 19, the gears 48, 49, 52, 58, 62 and 68 rotate. Because of the 1:10 gear ratios, the potentiometer arms 54, 64 and 72 experience angular rotations which are 10, 100 and 1,000 times less than the rotation of the potentiometer arm 42. For example, with a measurement such as 279.4° K., the potentiometer arm 42 has 279.4 revolutions; the arm 54 has 27.94 revolutions, the arm 64 has 2.794 revolutions; and the arm 72 has 0.2794 revolution. Since the voltage on a potentiometer arm returns to zero after each complete revolution it is only the partial revolutions which determine the voltage. In the example above, with 10 volts impressed on the potentiometers 43, 56, 66 and 74 in alternate polarities, the voltage on the tap 72 is +2.794 volts, the voltage on the tap 64 is −7.94 volts, the voltage on the tap 54 is +9.4 volts and the voltage on the tap 42 is 4 volts.

The voltage on the tap 64 is then divided by ten in the dividing and adding network formed by the resistances 94 and 96 and is combined with the voltage on the tap 72 to produce an output voltage which is proportional to the value of the first digit. In the example above, a voltage of −.794 volt is combined with the voltage of +2.794 volts on the tap 72 to produce a resultant voltage of 2.0 volts on the output lead 98. Likewise, the voltage on the tap 54 is decimally divided in the network comprising the resistances 90 and 92 and is then combined with the voltage on the tap 64 to produce a resultant voltage proportional to the second digit. With the temperature of 279.4° K., a voltage of 0.94 volt is combined with the voltage of −7.94 volts to produce a resultant voltage of −7 volts on the output lead 93. This resultant voltage is proportional to the second digit of the temperature measurement. Only the magnitude of this voltage may be used, with the polarity being disregarded, or the polarity of this negative voltage may be inverted by a stage (not shown) to obtain a positive voltage of 7 volts. Similarly, voltages may be obtained which are proportional to the values of the other digits in the multi-digital number.

The digitizer described above has several important advantages. The voltages which are produced are substantially proportional to the value of the digits. These voltages may be introduced to suitable meters to provide an instantaneous visual indication of the numerical values. The voltages may also be introduced directly to suitable circuits, such as multivibrators or phantastrons, to produce pulses which are separated from each other by time intervals which are determined by the voltages. For example, the multivibrators may be initially biased to produce a time delay of 30 microseconds when the voltage from the digitizer is zero. This initial time delay corresponds to a value of "0" for the digit in question. An additional time interval of 30 microseconds may be provided by the multivibrators for each volt on the output leads from the digitizer. With a number like 279.4° K., a recognition pulse may be initially transmitted, followed 90 microseconds later by a second pulse. A third pulse may be transmitted 240 microseconds after the second pulse and a fourth pulse may be transmitted 300 microseconds after the third pulse, etc.

Figure 2:
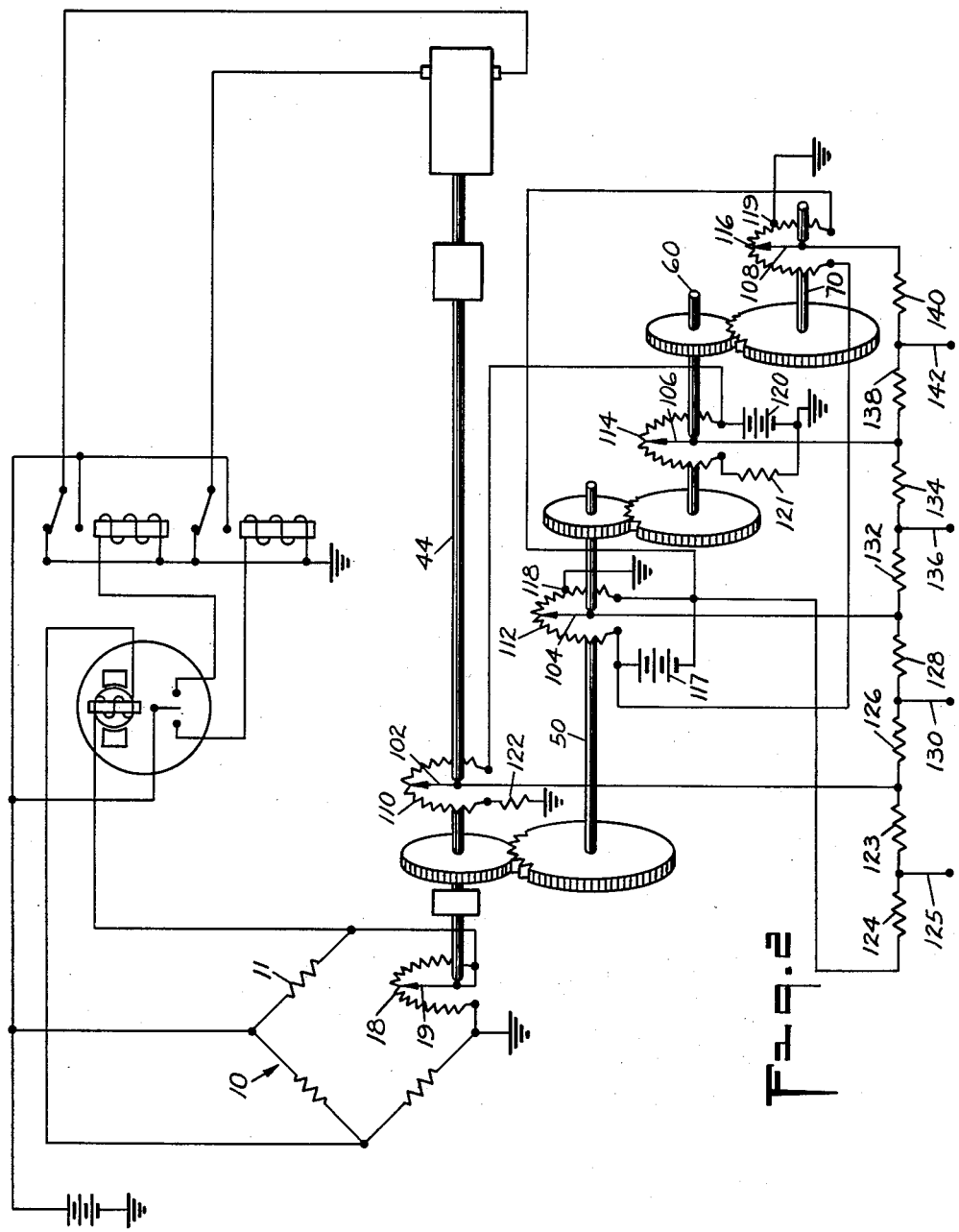
Figure 2 is a schematic diagram of another embodiment of the invention.

Figure 2 illustrates another embodiment of the invention. In this embodiment, a gear train similar to that shown above may be used to drive the shafts 44, 50, 60 and 70. The shafts 44, 50, 60 and 70 carry arms 102, 104, 106 and 108 of potentiometers 110, 112, 114 and 116, respectively. The potentiometers 112 and 116 are connected at one side to the positive terminal of a suitable power supply, such as a battery 117, so that the voltage on the arms 104 and 108 increases as the temperature rises. The potentiometers 112 and 116 are connected at the other side to the negative terminals of the battery 117 and are grounded at terminals 118 and 119, respectively. The terminals 118 and 119 are so chosen in the potentiometers that, with ten volts supplied by the battery 117, one side of the potentiometers 112 and 116 is approximately 8.99 volts above ground and the other side of the potentiometers is approximately −1.01 volts below ground.

The potentiometers 110 and 114 are connected to a battery 120 to provide a voltage decrease on the arms 102 and 106 as the temperature increases. One side of the potentiometer 114 is connected directly to the positive terminal of the battery 120 and the other side of the potentiometer is connected through a resistance 121 to the negative terminal of the battery. The potentiometer 110 is similarly connected in series with the battery 120 and a resistance 122. The battery 120 and the resistances 121 and 122 are chosen to provide a range of 0.10 volt to 10.10 volts on the potentiometers 110 and 114.

The arm 102 is connected to the negative terminal of the battery 117 through a series network which includes a pair of resistances 123 and 124 having a 10:1 ratio to each other and at least a 10:1 ratio to the potentiometer 110. An output lead 125 is connected to the common terminal between the resistances 123 and 124. The arms 102 and 104 are connected in series with a voltage dividing and adding network which includes a pair of resistances 126 and 128 having a 1:10 ratio to each other, with the resistance 126 being at least ten times as great as the potentiometers 110 and 112. An output lead 130 is connected to the common terminal between the resistances 126 and 128. Similarly, the arms 104 and 106 are in series with a pair of resistances 132 and 134 having a 1:10 ratio to each other, and an output lead 136 extends from the common terminal between the resistances 126 and 128. The potentiometer arms 106 and 108 are connected to resistances 138 and 140, the resistance 140 being 10 times as great as the resistance 138. An output lead 142 extends from the common terminal between the resistances 138 and 140.

With the voltages disclosed above impressed on the batteries 117 and 120, the voltage on the arm 108 is substantially proportional to a number formed by removing an integer from the value of the first digit of the multi-digital number. The voltage on the arm 106 is substantially proportional to the decimal complement of a number formed by removing the first digit from the multi-digital number. One tenth of the voltage on the arm 106 is added to the voltage on the arm 108 to produce a resultant voltage on the output lead 142 which is proportional to the value of the first digit. For example, with a measurement of 279.4° K., the voltage on the arm 108 is 2.794−1.01=1.784 volts and the voltage on the arm 106 is 10.10−7.94=2.16 volts. The voltage of 2.16 volts is decimally divided in the network which includes the resistances 138 and 140, and the resultant voltage is combined with the voltage of 1.784 volts on the arm 108 to produce a voltage of 1.784+0.216=2 volts. This voltage is proportional to the value of the first digit in the multi-digital number.

The voltage on the arm 104 is substantially proportional to a number formed by disregarding the first two digits of the multi-digital number and subtracting one integer from the value of the first remaining digit. This voltage is decimally divided by the resistances 132 and 134 and is combined with the voltage on the arm 106 to produce an output voltage which is proportional to the decimal complement of the second digit. When the measurement is 279.4° K., the voltage on the arm 104 is 9.4−1.01=8.39 volts. If this voltage is decimally divided and combined with the voltage of 2.16 volts on the arm 106, an output voltage of 2.16+0.839=3.0 volts is produced on the lead 136. The voltage of 3 volts is proportional to the decimal complement of the second digit—i. e., 10−7=3.

The output voltages for the third digit and all other odd digits are obtained in the same way as the first digit and the output voltages for the fourth digit and all other even digits are obtained in the same way as the second digit. The output voltages for the odd digits are substantially proportional to the values of the digits and the output voltages for the even digits are substantially proportional to the decimal complements of the digits.

There are thus provided systems for, and methods of, expressing a continuously variable quantity as a multi-digital number and determining the value of each digit in the number. The systems further operate to provide output voltages which are proportional to the value of each digit in the number.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination with means for expressing a continuously variable quantity as a multi-digital number, apparatus for separating each digit in the number and determining its value, including, means for providing a first voltage in accordance with the multi-digital number, means for providing a second voltage in accordance with a number resulting from the removal from the multi-digital number of the digit having the highest order, means for arithmetically combining the first and second voltages to obtain a voltage bearing a relationship proportionate to the highest order digit of the multi-digital number, means for providing a third voltage in accordance with a number resulting from the removal from the multi-digital number of the two digits having the highest order, and means for arithmetically combining the second and third voltages to obtain a voltage bearing a relationship proportionate to the value of the digit having the second highest order.

2. In combination with means for expressing a continuously variable quantity as a multi-digital number, apparatus for separating each digit in the number and determining its value, including, means for providing a first voltage bearing a proportionate relationship to the multi-digital number, means for providing a second voltage bearing a proportionate relationship to a number resulting from the removal from the multi-digital number of the digit having the highest order, means for arithmetically combining the first and second voltages to obtain a voltage bearing a linear relationship to the digit having the highest order, means for providing a third voltage bearing a proportionate relationship to a number resulting from the removal from the multi-digital number of the two digits having the highest order, and means for adding the second and third voltages to obtain a voltage bearing a relationship proportionate to the value of the digit having the second highest order.

3. In combination with means for expressing a continuously variable quantity as a multi-digital number, apparatus for separating each digit in the number and determining its value, including, means for providing a pair of voltages in proportion to a first number determined by the value of the multi-digital number and a second number formed by the removal from the multi-digital number of the digit having the highest order, means for arithmetically combining the voltages to obtain a voltage proportional to the value of the digit having the highest order, means for providing successive pairs of voltages in proportion to numbers formed with the digit to be measured as the digit of highest order and numbers formed upon the removal of this digit, and means for arithmetically combining each pair of voltages to obtain a voltage bearing a proportionate relationship to the value of a particular digit in the multi-digital number.

4. In combination with means for expressing a continuously variable quantity as a multi-digital number, apparatus for separating each digit in the number and determining its value, including, means for providing a first pair of voltages bearing a proportionate relationship to a number determined by the value of the multi-digital number and a second number formed by the removal from the multi-digital number of the digit having the highest order, means for arithmetically combining the voltages to obtain a voltage bearing a proportionate relationship to the value of the digit having the highest order, means for obtaining a second pair of voltages bearing a proportionate relationship to the second number and a number formed by the removal of the digits having the first and second highest order, and means for arithmetically combining the second pair of voltages to obtain a voltage bearing a proportionate relationship to the value of the digit having the second highest order.

5. In combination with means for expressing a continuously variable quantity as a multi-digital number, apparatus for separating each digit in the number and determining its value, including, means for providing a first voltage in proportion to the value of the multi-digital number, means for providing a second voltage of opposite polarity and in proportion to the value of a number formed by the removal from the multi-digital number of the digit having the highest order, means for arithmetically combining the first and second voltages to obtain a voltage proportional to the value of the digit having the highest order, means for providing successive pairs of oppositely polarized voltages in proportion to a number having the digit to be measured as the digit of highest order and a number having only the digits of lower order than the digit to be measured, and means for arithmetically combining each pair of voltages to obtain a voltage proportional to a particular digit.

6. In combination with apparatus for expressing a continuously variable quantity as a multi-digital number, apparatus for separating each digit in the number and determining its value, including, means for providing a first voltage substantially proportional to a number corresponding to the value of the multi-digital number except for a decrease of one integer in the value of the digit having the highest order, means for providing a second voltage substantially proportional to the decimal complement of a number formed by the removal from the multi-digital number of the digit having the highest order, means for adding the first and second voltages to obtain a voltage proportional to the value of the digit having the highest order, means for providing successive pairs of voltages substantially proportional to a first number formed with the digit to be measured as the digit of highest order except for a decrease of an integer in the value of this digit and to a second number which is the decimal complement of a number formed by the removal of the digit to be measured, means for arithmetically combining alternate pairs of voltages to produce voltages proportional to the values of particular digits, and means for arithmetically combining the other pairs of voltages to produce voltages proportional to the decimal complements of the other digits in the multi-digital number.

7. In combination with apparatus for expressing a continuously variable quantity as a multi-digital number, apparatus for separating each digit in the number and determining its value, including, means for providing a first voltage bearing a linear relationship to a number corresponding to the value of the multi-digital number, means for providing a second voltage bearing a linear relationship to the decimal complement of a number formed by the removal from the multi-digital number of the digit having the highest order, means for adding the first and second voltages to obtain a voltage bearing a linear relationship to the value of the digit having the highest order, means for providing successive pairs of voltages bearing a linear relationship to a first number formed with the digit to be measured as the digit having the highest order and to a second number which is the decimal complement of a number formed by the removal of the digit to be measured, means for alternately combining pairs of voltages arithmetically to produce voltages bearing a linear relationship to the values of the odd digits, and means for alternately combining other pairs of voltages arithmetically to produce voltages bearing a linear relationship to the decimal complements of the other digits in the multi-digital number.

8. In combination with means for expressing a continuously variable quantity as a multi-digital number, apparatus for separating each digit in the number and determining its value, including, means for providing a first voltage bearing a linear relationship to a number corresponding to the value of the multi-digital number, means for providing a second voltage bearing a linear relationship to the decimal complement of a number formed by the removal from the multi-digital number of the digit having the highest order, means for adding the first and second voltages to obtain a voltage bearing a linear relationship to the value of the digit having the highest order, means for obtaining a third voltage bearing a linear relationship to a number formed by the removal of the digits having the first and second highest orders, and means for arithmetically combining the second and third voltages to obtain a voltage bearing a linear relationship to the decimal complement of the value of the digit having the second highest order.

9. A method of expressing a continuously variable quantity as a multi-digital number and of separating each digit in the number and determining its value, including, providing a first voltage in proportion to the multi-digital number, providing a second voltage in proportion to a number formed by removing from the multi-digital number the digit having the highest order, arithmetically combining the first and second voltages to produce a resultant voltage dependent upon the value of the digit having the highest order, providing a third voltage in proportion to a number formed by removing from the multi-digital number the digits having the first and second highest orders, and arithmetically combining the second and third voltages to produce a resultant voltage dependent upon the value of the digit having the second highest order.

10. A method of expressing a continuously variable quantity as a multi-digital number and of separating each digit in the number and determining its value, including, providing a first pair of voltages bearing a proportionate relationship to the multi-digital number and to a number formed by removing from the multi-digital number the digit having the highest order, arithmetically combining the first pair of voltages to obtain a resultant voltage bearing a relationship proportionate to the value of the digit having the highest order, providing successive pairs of voltages in proportion to a number formed with the digit to be measured as the digit having the highest order and a number formed by the removal of this digit, and arithmetically combining each pair of voltages to produce a voltage bearing a relationship proportionate to the value of a particular digit.

11. A method of separating a continuously variable quantity as a multi-digital number and of separating each digit in the number and determining its value, including, providing a first voltage proportional to the value of the multi-digital number, providing a second voltage of opposite polarity to the first voltage and proportional to a number formed by removing from the multi-digital number the digit having the highest order, arithmetically combining the two voltages to produce a resultant voltage proportional to the value of the digit having the highest order, providing successive pairs of oppositely polarized voltages in proportion to a number having the digit to be measured as the digit having the highest number and a number having only the digits of lower order than the digit to be measured, and arithmetically combining each pair of voltages to produce a resultant voltage proportional to the value of a particular digit.

12. A method of expressing a continuously variable quantity as a multi-digital number and of seperating each digit in the number and determining its value, including, providing a first voltage bearing a linear relationship to a number corresponding to the multi-digital number, providing a second voltage bearing a linear relationship to the decimal complement of a number formed by removing from the multi-digital number the digit having the highest order, arithmetically combining the first and second voltages to produce a voltage bearing a linear relationship to the value of the digit having the highest order, providing successive pairs of voltages bearing a linear relationship to a first number formed with the digit to be measured as the digit having the highest order and to a second number which is the decimal complement of a number formed by the removal of the digit to be measured, arithmetically combining alternate pairs of voltages to produce voltages bearing a linear relationship to the values of particular digits, and arithmetically combining the other pairs of voltages to produce voltages bearing a linear relationship to the decimal complements of the other digits in the multi-digital number.

13. A method of expressing a continuously variable quantity as a multi-digital number and of separating each digit in the number and determining its value, including, providing a first voltage substantially proportional to a number corresponding to the multi-digital number except for a decrease of an integer in the value of the digit having the highest order, providing a second voltage substantially proportional to the decimal complement of a number formed by removing from the multi-digital number the digit having the highest order, arithmetically combining the first and second voltages to produce a voltage proportional to the value of the digit having the highest order, providing successive pairs of voltages which are substantially proportional to a first number formed with the digit to be measured as the digit having the highest order except for the decrease of an integer in the value of this digit and to a second number which is the decimal complement of a number formed by the removal of the digit to be measured, alternately combining pairs of voltages arithmetically to produce voltages proportional to the values of the odd digits, and arithmetically combining the other pairs of voltages to produce voltages proportional to the decimal complements of the other digits in the multi-digital number.

CHARLES A. PIPER.
LOWELL R. BROWN.

REFERENCES CITED

The following references are of record in the file of this patent:

UNITED STATES PATENTS

| Number | Name | Date |
| --- | --- | --- |
| 2,025,407 | Williams | Dec. 24, 1935 |
| 2,108,146 | Simpson | Feb. 15, 1938 |
| 2,123,142 | McMaster | July 5, 1938 |
| 2,484,737 | Razik | Oct. 11, 1949 |

OTHER REFERENCES

"The Binary Quantizer," K. H. Barney, Electrical Engineering, November 1949.